United States Patent Office 2,955,461
Patented Oct. 11, 1960

2,955,461
ELECTROMAGNETIC TORSIONAL FEELER

Borivoj Dubsky and Oldrich Straka, Prague, Czechoslovakia, assignors to Vyzkumny a zknsebni letecky ustav, Letnany, near Prague, Czechoslovakia Filed Aug. 21, 1958, Ser. No. 756,487

Claims priority, application Czechoslovakia Aug. 24, 1957

2 Claims. (Cl. 73—141)

The present invention relates to an electromagnetic torsional feeler transforming a mechanical value, or if required a ratio of two mechanical values, into an electric value.

The hitherto existing electromagnetic torsional feelers for transforming a mechanical value into an electric value, which are based on the utilization of the so-called Wiedemann effect, comprise usually a torsional body subjected to torsional stress which is surrounded by a pick-up coil and excited by alternating current so as to produce a rotational magnetic field in the body, said magnetic field being deformed when the body is twisted. The longitudinal component of the magnetic field, which is proportional to the twist of the body, is picked up by a pick-up coil in the form of an electromagnetic force.

A disadvantage of this type of feelers is a certain dependence of the picked up electromotive force on the frequency variations of the electrical power supply, the temperature of the environment of the feeler, and to a small extent also on voltage variations of the power supply. If such a feeler is to be used for very precise measurements, these influences have therefore to be compensated for in the measuring circuits. It is a further disadvantage of such conventional feelers that they do not permit a direct measurement of the ratio of two mechanical values, which must usually be determined when measurements of a very precise nature are to be performed.

The present invention relates to an electromagnetic torsional feeler which permits an exact measurement or registration of a mechanical value or, if required, of the ratio of two mechanical values by a mechanical connection of four simple torsional feelers on one common torsional body, and by a suitable connection of the pick-up coils of these feelers.

The accompanying drawing represents, by way of example, a feeler according to the invention and its circuitry.

Figure 1:
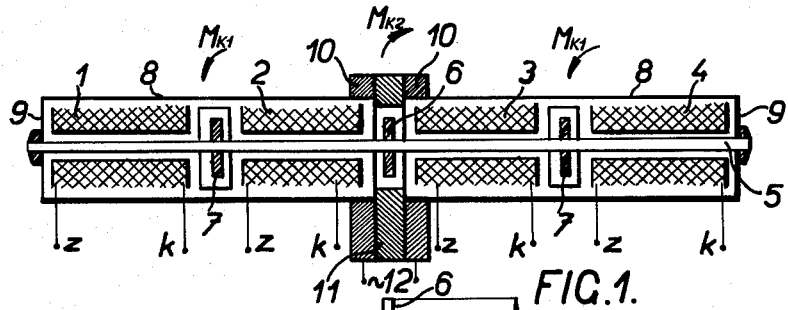
Figure 2:
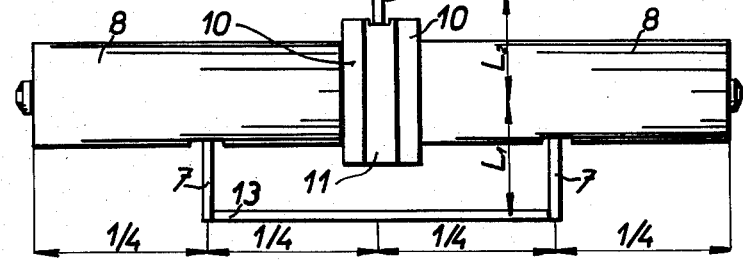
Figure 3:
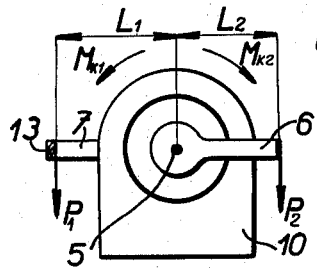
Figure 5:
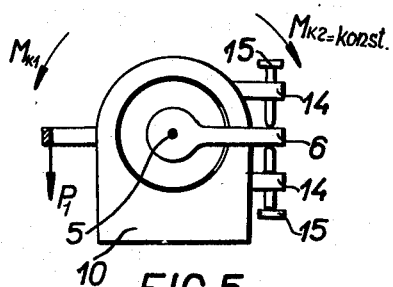
Figure 4:
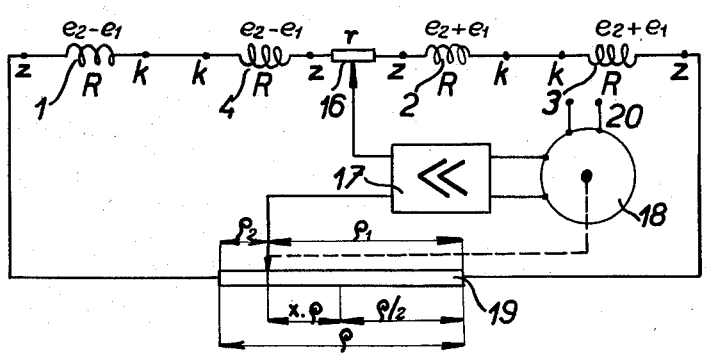

Fig. 1 shows an axial section of a preferred embodiment of the feeler of the invention, Fig. 2 shows the feeler of Fig. 1 in a plan view, Fig. 3 is a side view thereof, Fig. 4 shows the wiring diagram of the feeler, and Fig. 5 represents another embodiment of the feeler of the invention in a side view.

The feeler according to Figs. 1 to 3 comprises a ferromagnetic torsional body 5 in the shape of a rod or tube, which at both ends is conductively connected to the bottoms 9 of jackets 8 consisting also of ferromagnetic material. The jackets 8 are connected with the bottoms 9 in such a manner as to permit the body to be initially twisted in one or the other direction, but the connection must be conductive, and after a suitable initial twisting of the body, it must be rigid. This may be achieved for example by soldering with a tin solder.

The free ends of the jackets 8 are rigidly and conductively secured to metal flanges 10, connected to respective terminals of an exciting circuit 12. Inserted between both flanges is an insulating inlay 11. Fastened in the centre of the torsional body 5 is an arm 6. Arms 7 are secured at the first and third quarters of the length of the body, and are connected by a yoke 13. The arms 6 and 7 are mounted on the body 5, care being taken not to interrupt the body by mounting the arms thereon. Coils 1, 2, 3, 4 are loosely and coaxially fitted on the body 5 in every quarter of its length.

The wiring of the pick-up coils 1 to 4 is apparent from Fig. 4. The coils 1 and 4 are connected in series, the end of the coil 1 being connected to the end of the coil 4. The beginning of the coil 4 is connected to one fixed terminal of the zero setting potentiometer 16. The other fixed terminal of the potentiometer 16 is conductively attached to the beginning of the coil 2. The end of the coil 2 is connected to the end of the coil 3 and the beginnings of the coils 1 and 3 are connected to the fixed terminals of a measuring potentiometer 19. The movable contacts of the potentiometers 16 and 19 are connected respectively to the input terminals of an amplifier 17, the output of which serves for supplying the control phase of a two-phase asynchronous motor 18. The exciting phase of this motor is connected to a current source 20. The motor 18 cooperates through a mechanical gear with the rider of the measuring potentiometer 19.

The feeler shown in Fig. 5 is equipped with holders 14 secured on one of its flange 10. The holders are each provided with a screw thread and set screws 15, which clamp the arm 6.

The feeler according to Figs. 1, 2 and 3 operates as follows:

Alternating current flowing through the body 5 from the exciting circuit 12 through the flanges 10, jacket 8 and bottoms of the jackets 9 produces a rotational magnetic field in the body. This field is deformed by the influence of the torque $Mk_2 = P_2.L_2$ produced by the force $P_2$ acting on the arm 6. The longitudinal component of the magnetic field produced by this deformation induces in the coils 1 and 2 a voltage $(+e_2)$ and in the coils 3 and 4 a voltage $(-e_2)$ of the same magnitude but of opposite sign. This voltage $e_2$ is therefore directly proportional to the torque $Mk_2$ or to the force $P_2$. The magnetic field of the body 5 is deformed by the torque $Mk_1 = P_1.L_1$ which is produced by the force $P_1$ acting on the arms 7, so that a voltage $(+e_1)$ is induced in the coils 2 and 4 while a voltage $(-e_1)$ of the same magnitude but of opposite sign is induced in the coils 1 and 3. If the coils 3 and 4 are connected in a circuit according to Fig. 4 with a reversed polarity relative to that of the coils 1 and 2, a voltage $(e_2-e_1)$ will be induced in the coil 1 and also a voltage $(e_2-e_1)$ in the coil 4 and a voltage $(e_2+e_1)$ in the coils 2 and 3. In the central branch of the circuit a current will flow which will be proportional to the difference $$e_1(4R+\rho) - e_2(\rho_1-\rho_2)$$

wherein $R$=ohmic resistance of one pick-up coil $\rho$=resistance of the potentiometers, and $\rho_1$ and $\rho_2$=the resistance of the branches of the potentiometers. This current, when amplified by the amplifier 17 actuates movement of the motor 18 and of the movable contact of the measuring potentiometer 19. The actuation of the motor and the resulting movement of the potentiometer contact continues until the current in the amplifier input equals zero i.e. until $$e_1(4R+\rho) = e_2(\rho_1-\rho_2)$$

It is obvious from this equation that if $$\rho_2 = \frac{\rho}{2} + x\rho \text{ and } \rho_2 = \frac{\rho}{2} - x\rho$$

where $x$ is the ratio of the distance of the movable potentiometer contact from the centre of the potentiometer to the entire length of the potentiometer, the following equations will apply.

$$x = \text{const.} \frac{e_1}{e_2}, \text{ or}$$

$$x = c \cdot \frac{Mk_1}{Mk_2}$$

i.e. the feeler permits the ratio of the two torques to be read from the zero setting potentiometer 16, when the apparatus is set for zero.

Instead of the amplifier 17, an alternating current galvanometer may be used in laboratory instruments, and the measuring potentiometer 19 may then be compensated by hand. Because both voltages $e_1$ and $e_2$ depend in the same way on the variations of voltage, and of the frequency of the exciting source on changes in ambient temperature and other interfering influences, these undesirable factors are automatically balanced in the circuit. The voltage which is proportional to the current in the central branch of the circuit, amplified by the amplifier 17, is phase shifted through 90° with respect to the voltage of the power supply. It is therefore not necessary to provide an element in the amplifier for shifting the phase of the control voltage of the motor 18.

Because coils 3 and 4 are connected to a circuit with reversed polarity, it may be achieved by the influence of the zero self-induction in the various branches of the circuit, that the voltages $e_1$ and $e_2$ are exactly in phase. It is therefore not necessary to rectify their phase difference prior to feeding the voltages to the amplifier.

The temperature compensation of the resistance of the coils 1 to 4 (copper winding) is possible in the simplest way by the choice of a high resistance $\rho$ of the potentiometer with respect to the resistances R of the coils. If only one mechanical value is measured, the feeler is initially twisted by a constant torque $Mk_2$ e.g. by means of screws 15, shown in Fig. 5. In precision measurements it is necessary that the voltages $e_2$ and $e_1$ induced in the various coils should be of exactly equal absolute values. This is achieved by a suitable initial twisting of the feeler at its ends, and by turning the bottoms 9 of the jackets 8, and by correct positioning of the force $P_1$ in the centre of the yoke 13. In some cases it is advantageous to design the feeler so as to obtain the moments $Mk_1$ in opposite directions, i.e. that in such manner that one part of the feeler is acted upon by a moment $Mk_3 = -Mk_1$. The coils 3 and 4 are then interchanged in the circuit i.e. the coil 3 is connected to the coil 1 and the coil 4 to the coil 2.

When large torques have to be measured, the feeler is provided with a body 5 in the shape of a tube, and the body together with the coils 1 to 4 is surrounded by a toroidal exciting winding extending through the centre of the tube. If the torsional body is excited to a magnetically saturated state, hysteresis is eliminated in the same way as in conventional torsional feelers.

The feeler according to the present invention transforms a mechanical value, or the ratio of two mechanical values, into an electric value with great precision. It is suitable in particular for all kinds of weighing devices. An adjustment of the torque $Mk_2$ by a change in the length of the arm 6 ($L_2$) or by a change of the weight of the load ($P_2$) permits the weighing range to be changed within very wide limits.

The new feeler makes possible the design of numerous instruments, not only of the indicating but also the recording type which are insensitive to changes in their environment to shocks, to changes in frequency and voltage of the electric power supply and which are capable of precise measurements even in the field and under most unfavorable conditions of operation. The feeler of the invention is particularly applicable to ratio determining instruments, such as ratio determining micro-pressure gauges, ratio determining electrical recording instruments, ratio determining thermometers, and the like; it may be used not only in measuring, but also in control instruments.

A special embodiment of the feeler according to the invention is the so-called "dual-feeler," which represents one half of the above described feeler. The moment $Mk_2$ is produced by a permanent twist of the torsional body 5 in the bottoms 9 of the jackets 8. The moment $Mk_1$ is produced by loading the arm 6, which in this case is rigidly secured in the centre of the feeler. The arms 7 and the coils 2 and 4 are dispensed with. The coils 1 and 2 are connected in the circuit in the same way as in the quadruple feeler. It is a disadvantage of this feeler that the moment $Mk_2$ may be produced only with a constant value i.e. it is possible to measure just one mechanical value, and further that due to self-induction of both coils the voltages $e_1$ and $e_2$ are not of equal phase.

We claim:

1. An electromagnetic torsional feeler for transforming the ratio of two mechanical values into an electric value, comprising a ferromagnetic body adapted to be subjected to a torsional stress, jackets surrounding the torsional body, bottoms in said jackets, adapted to rigidly secure the torsional body at its ends, flanges rigidly fastened to the ends of the jackets opposite their bottoms, an insulating inlay separating the flanges, an exciting current circuit connected to said flanges, an arm mounted on the torsional body in the centre of its length, levers mounted on the torsional body in each quarter of its length, a yoke connecting said levers, pick-up coils loosely fitted on the torsional body between the arm and the levers, and outside the later, a zero setting potentiometer, a measuring potentiometer, an amplifier, a servomotor and a movable contact on each of the potentiometers connected into the circuit of the pick-up coils, the connection being such that the end of one outer coil is connected to the end of the other outer coil, the beginning of the latter being attached to the end of the zero setting potentiometer, while the other end of the zero setting potentiometer is connected to the beginning of one inner coil, the end of which is attached to the end of the other inner coil, and the beginnings of the outer coil and inner coil are connected to the ends of the measuring potentiometer, the movable contact of which, together with the movable contact of the zero setting potentiometer is attached to the input of said amplifier, the output of which is connected to the control phase of said servomotor which controls the position of the movable contact of the measuring potentiometer.

2. A feeler as claimed in claim 1, wherein the arm is clamped between screws which are screwed in holders, secured to the flange.

References Cited in the file of this patent
UNITED STATES PATENTS 2,511,178    Roters _____ June 13, 1950

FOREIGN PATENTS 161,295    Sweden _____ Nov. 12, 1957